(12) United States Patent
Dormody et al.

(10) Patent No.: US 12,553,716 B2
(45) Date of Patent: *Feb. 17, 2026

(54) SYSTEMS AND METHODS FOR DETERMINING WHEN AN ESTIMATED ALTITUDE OF A MOBILE DEVICE CAN BE USED FOR CALIBRATION OR LOCATION DETERMINATION

(71) Applicant: NextNav, LLC, Sunnyvale, CA (US)

(72) Inventors: Michael Dormody, San Jose, CA (US); Guiyuan Han, San Jose, CA (US); Badrinath Nagarajan, Cupertino, CA (US)

(73) Assignee: NextNav, LLC, Santa Clara, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 18/068,295

(22) Filed: Dec. 19, 2022

(65) Prior Publication Data

US 2023/0121848 A1 Apr. 20, 2023

Related U.S. Application Data

(63) Continuation of application No. 16/364,657, filed on Mar. 26, 2019, now Pat. No. 11,555,699.

(Continued)

(51) Int. Cl.
*G01C 5/00* (2006.01)
*G01L 27/00* (2006.01)
(Continued)

(52) U.S. Cl.
CPC .............. *G01C 5/00* (2013.01); *G01L 27/002* (2013.01); *G01S 5/01* (2020.05); *G06F 17/18* (2013.01); *H04W 4/029* (2018.02)

(58) Field of Classification Search
CPC ........ G01C 5/00; H04W 4/029; G01L 27/002; G06F 17/18
See application file for complete search history.

(56) References Cited

U.S. PATENT DOCUMENTS 8,130,141 B2 3/2012 Pattabiraman et al.
9,057,606 B2 6/2015 Wolf et al.
(Continued)

OTHER PUBLICATIONS

Form PCT/ISA/210, PCT/US2019/024015, "International Search Report", 3 page(s); EPO Form P04A42, PCT/JS2019/024015, "Information on Search Strategy", 1 page(s); Form PCT/ISA/237, PCT/US2019/024015, "Written Opinion of the International Searching Authority", 6 page(s). Date of Mailing Oct. 4, 2019.

(Continued)

*Primary Examiner* — Shelby A Turner
*Assistant Examiner* — Xiuqin Sun
(74) *Attorney, Agent, or Firm* — MLO, a professional corp.

(57) ABSTRACT

Determining when an estimated altitude of a mobile device can be used for calibration or location determination. Particular systems and methods determine an area in which the mobile device is expected to reside, determine an altitude value of each section of a plurality of sections in the area, determine if the altitude values meet a threshold condition, and determine that the estimated altitude of the mobile device can be used for determining the position of the mobile device or for calibrating a pressure sensor of the mobile device when the altitude values meet the threshold condition.

17 Claims, 16 Drawing Sheets

Related U.S. Application Data

(60) Provisional application No. 62/676,264, filed on May 24, 2018.

(51) Int. Cl.
*G01S 5/00* (2006.01)
*G06F 17/18* (2006.01)
*H04W 4/029* (2018.01)

(56) References Cited

U.S. PATENT DOCUMENTS

| | | | |
|---|---|---|---|
| 9,980,246 | B2 | 5/2018 | Pattabiraman et al. |
| 10,514,258 | B2 * | 12/2019 | Dormody ............... G01C 25/00 |
| 11,555,699 | B2 * | 1/2023 | Dormody ................ G01S 5/01 |
| 2016/0047649 | A1 * | 2/2016 | Edge ........................ H04B 1/40 73/384 |
| 2016/0091385 | A1 | 3/2016 | Heshmati et al. |
| 2016/0245716 | A1 | 8/2016 | Gum et al. |
| 2016/0273903 | A1 * | 9/2016 | Cattoen ................. G01B 21/04 |
| 2016/0356875 | A1 | 12/2016 | Wolf |
| 2017/0234756 | A1 | 8/2017 | Youssef et al. |
| 2017/0280301 | A1 | 9/2017 | Chang et al. |
| 2018/0206078 | A1 * | 7/2018 | Venkatraman ........ H04W 4/025 |
| 2019/0313219 | A1 * | 10/2019 | Zhu ....................... H04W 4/021 |
| 2019/0360804 | A1 | 11/2019 | Dormody et al. |
| 2020/0088517 | A1 | 3/2020 | Dormody et al. |
| 2020/0116483 | A1 | 4/2020 | Dormody et al. |

OTHER PUBLICATIONS

Germann et al., "Scale-Dependence of the Predictability of Precipitation from Continental Radar Images. Part I: Description of the Methodology", American Meteorological Society, Monthly Weather Review, vol. 130, Dec. 2002, pp. 2859-2873.

Ghaderi et al., "Deep Forecast: Deep Learning-based Spatio-Temporal Forecasting", ICML 2017 Time Series Workshop, Sydney, Australia, 2017, 6 pages.

Henn et al., "A Comparison of Methods for Filling Gaps in Hourly Near-Surface Air Temperature Data", Journal of Hydometeorology, American Meteorological Society, vol. 14, Jun. 2013, pp. 929-945.

Moffat et al., "Comprehensive comparison of gap-filling techniques for eddy covariance net carbon fluxes", Agricultural and Forest Meteorology, vol. 147, Issues 3-4, Dec. 10, 2007, pp. 209-232.

Notice of Allowance and Fees dated Sep. 22, 2022 for U.S. Appl. No. 16/364,657.

Notice of Allowance dated Apr. 6, 2021 for U.S. Appl. No. 16/364,695.

Office Action dated Aug. 4, 2021 for U.S. Appl. No. 16/364,657.

Office Action dated Jan. 13, 2022 for U.S. Appl. No. 16/364,657.

Office Action dated May 24, 2022 for U.S. Appl. No. 16/364,657.

Sankaran et al., "Using Mobile Phone Barometer for Low-Power Transportation Context Detection", SenSys '14 Proceedings of the 12th ACM Conference on Embedded Network Sensor Systems, Nov. 3-6, 2014, pp. 191-205.

\* cited by examiner

SYSTEMS AND METHODS FOR DETERMINING WHEN AN ESTIMATED ALTITUDE OF A MOBILE DEVICE CAN BE USED FOR CALIBRATION OR LOCATION DETERMINATION

CROSS-REFERENCE TO RELATED APPLICATIONS

This application is a continuation of U.S. patent application Ser. No. 16/364,657, filed Mar. 26, 2019, which claims priority to U.S. Provisional Patent Application No. 62/676,264, filed May 24, 2018, all of which are hereby incorporated by reference herein in their entirety.

BACKGROUND

Determining the exact location of a mobile device (e.g., a smart phone operated by a user) in an environment can be quite challenging, especially when the mobile device is located in an urban environment or is located within a building. Imprecise estimates of the mobile device's altitude, for example, may have life or death consequences for the user of the mobile device since the imprecise altitude estimate can delay emergency personnel response times as they search for the user on multiple floors of a building. In less dire situations, imprecise altitude estimates can lead a user to the wrong area in an environment.

Different approaches exist for estimating an altitude of a mobile device. In a barometric-based positioning system, altitude can be computed using a measurement of pressure from a calibrated pressure sensor of a mobile device along with ambient pressure measurement(s) from a network of calibrated reference pressure sensors and a measurement of ambient temperature from the network or other source. An estimate of an altitude of a mobile device ($h_{mobile}$) can be computed by the mobile device, a server, or another machine that receives needed information as follows:

$$h_{mobile} = h_{sensor} - \frac{RT_{remote}}{gM}\ln\left(\frac{P_{sensor}}{P_{mobile}}\right), \quad \text{(Equation 1)}$$

where $P_{mobile}$ is the estimate of pressure at the location of the mobile device by a pressure sensor of the mobile device, $P_{sensor}$ is an estimate of pressure at the location of a reference pressure sensor that is accurate to within a tolerated amount of pressure from true pressure (e.g., less than 5 Pa), $T_{remote}$ is an estimate of temperature (e.g., in Kelvin) at the location of the reference pressure sensor or a different location of a remote temperature sensor, $h_{sensor}$ is an estimated altitude of the reference pressure sensor that is estimated to within a desired amount of altitude error (e.g., less than 1.0 meters), g corresponds to the acceleration due to gravity, R is a gas constant, and M is molar mass of air (e.g., dry air or other). The minus sign (−) may be substituted with a plus sign (+) in alternative embodiments of Equation 1, as would be understood by one of ordinary skill in the art. The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor. The reference-level pressure can be determined as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the reference pressure sensor, $P_{ref}$ is the reference-level pressure estimate, and $h_{ref}$ is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

The pressure sensor of the mobile device is typically inexpensive and susceptible to drift, which leads to inaccurate computations of the altitude of the mobile device using Equation 1 or variations thereof. Thus, there is a need to determine whether a computed altitude is accurate or when to calibrate the pressure sensor of a mobile device. Approaches for knowing when a computed altitude is accurate or when a pressure sensor of a mobile device can be calibrated are described herein.

DETAILED DESCRIPTION

An altitude of a mobile device can be estimated using a measurement of pressure from a pressure sensor of a mobile device. Unfortunately, the pressure sensor of the mobile device is typically inexpensive and susceptible to drift, which leads to inaccurate computations of the altitude of the mobile device. The pressure sensor of the mobile can be calibrated when the mobile device is at a known altitude, such that an estimated altitude is expected to match the known altitude. However, knowing the exact altitude of the mobile device is sometimes not possible. Approaches for determining when a pressure sensor of a mobile device can be calibrated when the true altitude of the pressure sensor is not exactly known are described herein. Also described herein are approaches for confirming whether an estimated altitude is accurate.

Figure 1:
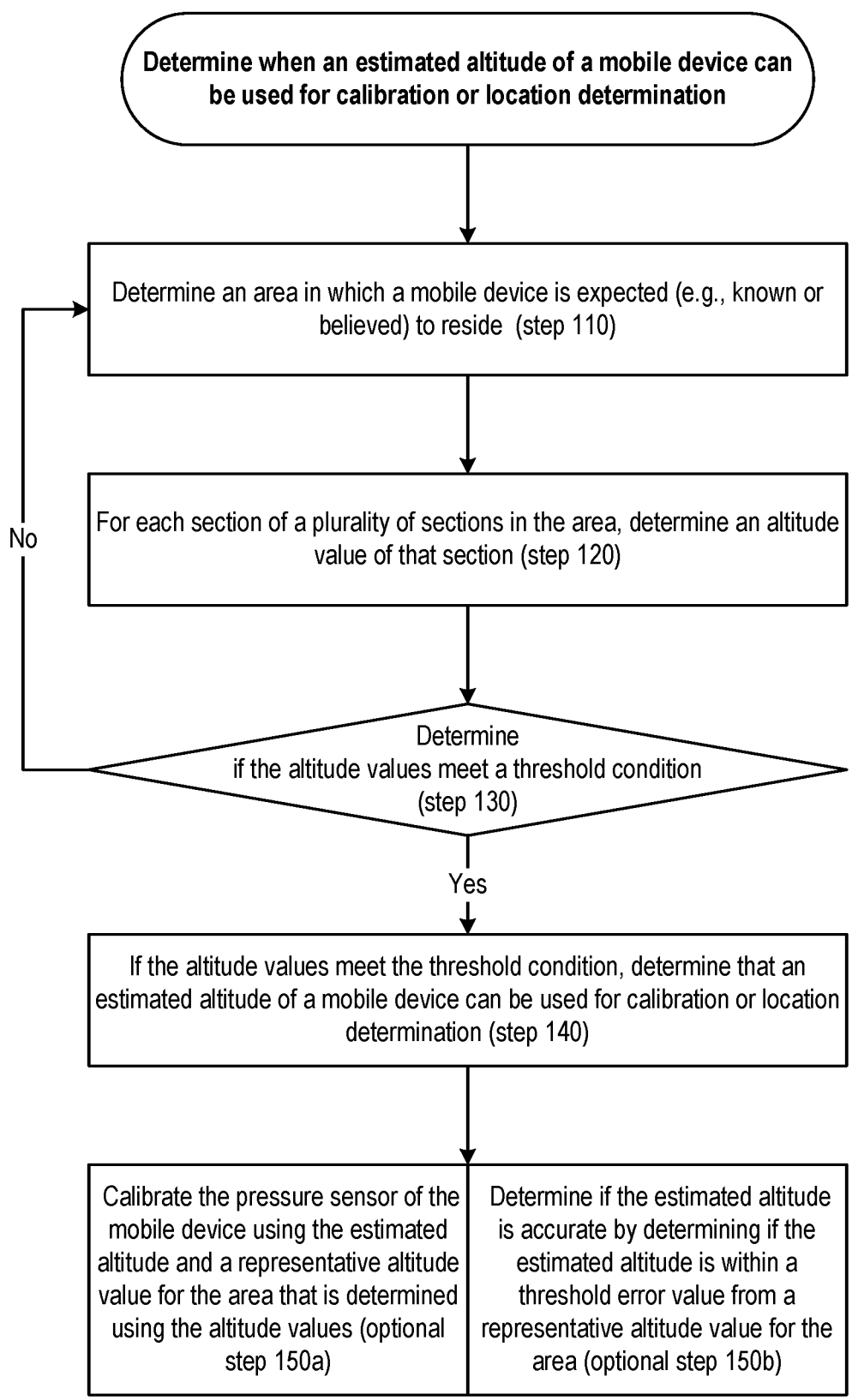
FIG. 1 depicts a process for determining when an estimated altitude of a mobile device can be used for calibration or location determination.

FIG. 1 depicts a process for determining when an estimated altitude of a mobile device can be used for calibration or location determination.

As shown, an area in which a mobile device is expected to reside is determined (step 110). The shape of the area may be any shape, including (i) a circle, (ii) a polygon, (iii) an ellipsoid, or (iv) any other shape that is centered or otherwise includes an initial two-dimensional or three-dimensional estimate of a position of the mobile device. Alternatively, the shape of the area may be the shape of a network area, where the shape of the network area can be any shape, including (i) a circular coverage area centered at a location of a beacon with a radius equal to the maximum range of the beacon, (ii) overlapping portions of circular coverage areas of beacons from which the mobile device received signals, or (iii) any other shape. Alternatively, the network area can be a group of separate areas that are accessible to the mobile device. By way of example, different implementations of step 110 are shown in FIG. 3 through FIG. 6, which are described later.

For each section of a plurality of sections in the determined area, an altitude value of that section is determined (step 120). Each section may be the same size (e.g., 1 square meter) or difference sizes, and the altitude value for each section may be accessed from a database or other source of data. In one embodiment, each section is a terrain tile, and the altitude value for each tile is accessed from the National Elevation Database. An optional adjustment for the terrain tile is to have an offset representing where the mobile device is located relative to the surface of the terrain (e.g., +1 m at a user's hip height, +2 m at a user's head if being used for a call, or other height).

A determination is made as to whether the altitude values meet a threshold condition (step 130). In one embodiment of step 130, as discussed later in more detail with respect to FIG. 11, determining if the altitude values meet a threshold condition may comprise: determining if a threshold percentage of the determined altitude values are within a first threshold amount of altitude from each other. In another embodiment of step 130, as discussed later in more detail with respect to FIG. 12, determining if the altitude values meet a threshold condition may comprise: determining if a threshold percentage of the determined altitude values are within a second threshold amount of altitude from a mean, median or value-of-interest (e.g., the altitude of the original latitude/longitude or the center of a confidence polygon) of the determined altitude values. The first threshold amount and the second threshold amount may be the same or different. Examples of a threshold amount of altitude include a tolerated amount of error (e.g., 1 meter or less), a fraction of the tolerated amount of error (e.g., one-half), or another amount. Examples of a threshold percentage include any percentage between 90% and 100%, or any other suitable percentage. Use of a median can be more outlier-resistant than a mean, and if there is a large outlier in the altitudes of the terrain tiles, the median-subtracted altitude distribution should better reflect the variation of altitude in a region. Alternatively, an outlier rejection method can be applied to the altitudes from the terrain tiles before being mean or median subtracted. The benefit of a value-of-interest is that it does not require the additional mean or median calculation once all the terrain tiles are queried—e.g., the value-of-interest is subtracted from the distribution instead of the mean or median).

If the altitude values do not meet the threshold condition, the process returns to step 110. If the altitude values meet the threshold condition, a determination is made that an estimated altitude of the mobile device can be used for determining the position of the mobile device or for calibrating a pressure sensor of the mobile device (step 140), and the estimated altitude of the mobile device is determined using a pressure measured by a pressure sensor of the mobile device if no such estimated altitude has already been determined. One approach for estimating the altitude uses Equation 1.

Optionally, the pressure sensor of the mobile device is calibrated using the estimated altitude and a representative altitude value for the area that is determined using the altitude values (optional step 150a). Examples of the representative altitude value determined using the altitude values include: (i) a mean value of the altitude values; (ii) a median value of the altitude values; (iii) the altitude value of a section at the center of the area in which the mobile device is known to reside; (iv) the most-common altitude value of the altitude values; (v) an interpolated altitude among centers of tiles; (vi) an interpolated altitude among centers of tiles neighboring an initial estimate of the mobile device's position; or (vii) any of the examples above, but with a smoothing filter applied. One advantage of the process of FIG. 1 is that calibration can occur when the exact altitude of the mobile device is not known. Instead, only a range of possible altitudes of the mobile need be known, where the size of the range is within a tolerated value (e.g., an amount of acceptable error like 1 meter, or a fractional amount of acceptable error like 0.5*1 meter). An example of how a mobile device may be calibrated during optional step 150a is described later under the 'Calibration' section.

Optionally, the accuracy of the estimated altitude is evaluated by determining if the estimated altitude is within a threshold error value from a representative altitude value for the area (optional step 150b). If so, the estimated altitude is considered to be accurate. If not, the estimated altitude is considered to not be accurate, and a determination is made that the pressure sensor of the mobile device needs to be calibrated. Examples of the representative altitude value are provided above in the description of step 150a. Examples of a threshold error value include a maximum tolerated error value, such as 1 meter or less, that may be optionally adjusted by a distance at which the mobile device is expected to be held above the representative altitude value.

By way of example, the process of FIG. 1 may be performed by one or more machines that include: processor(s) or other computing device(s) (e.g., at a mobile device and/or server) for performing (e.g., that perform, or are configured, adapted or operable to perform) each step, and data source(s) at which any data identified in the processes is stored for later access during the processes.

For purposes of illustrating the process of FIG. 1, attention is now drawn to FIG. 2A, FIG. 2B, FIG. 2C, and FIG. 2D, which illustrate different implementations of the process depicted in FIG. 1.

Figure 2A:
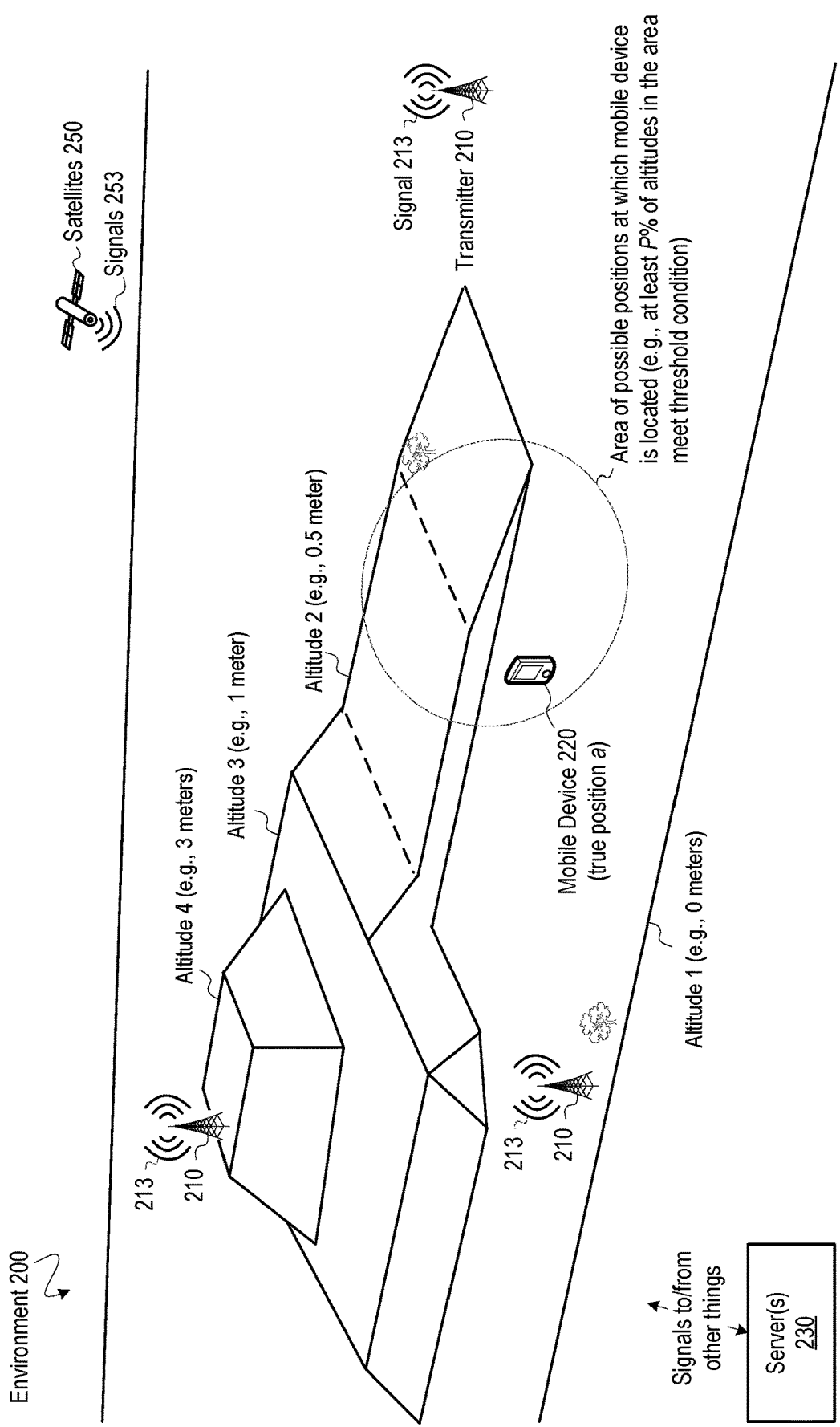
FIG. 2A, FIG. 2B, FIG. 2C, and FIG. 2D illustrate different implementations of a process for determining when an estimated altitude of a mobile device can be used for calibration or location determination.
Figure 2B:
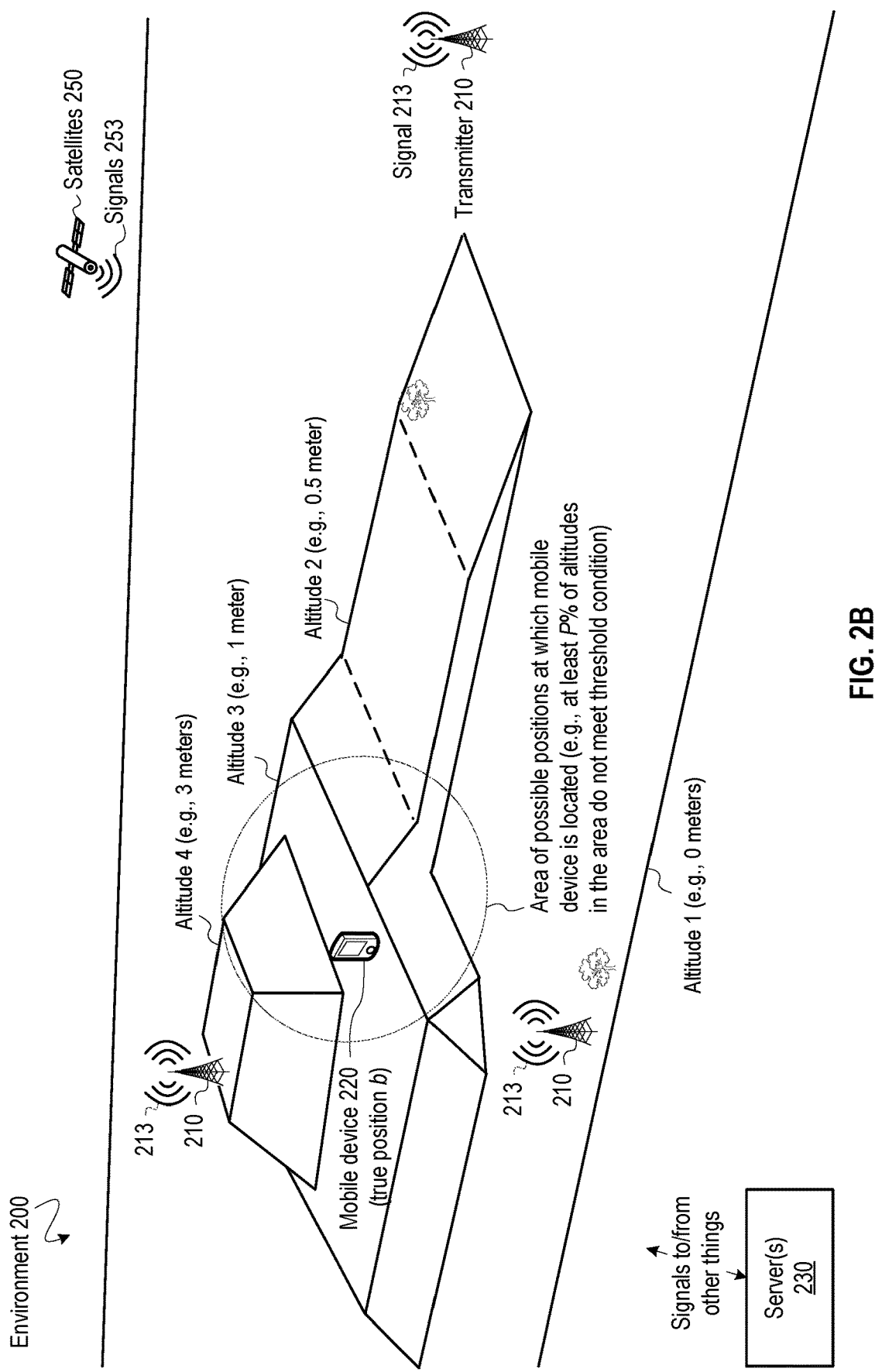

An operational environment 200 illustrated in FIG. 2A and FIG. 2B includes a network of terrestrial transmitters 210 and a mobile device 220. Each of the transmitters 210 and the mobile device 220 may be located at different altitudes or depths. Positioning signals 213 and 253 are respectively sent to the mobile device 220 from the transmitters 210 and satellites 250 using known wireless or wired transmission technologies. The transmitters 210 may transmit the signals 213 using one or more common multiplexing parameters—e.g. time slot, pseudorandom sequence, frequency offset, or other. The mobile device 220 may take different forms, including a mobile phone, a tablet, a laptop, a tracking tag, a receiver, or another suitable device that can receive the positioning signals 213 and/or 253, and that has a pressure sensor for determining a measurement of pressure at a location of the mobile device 220. Each of the transmitters 210 may also include a pressure sensor that measures pressure, and a temperature sensor that measures temperature, at the location of that transmitter 210. Measurements of pressure and temperature can be used to compute an estimated altitude of the mobile device 220 using Equation 1.

In FIG. 2A, an area of possible positions at which the mobile device 220 is located may be determined (e.g., during step 110), and a determination is made as to whether a predefined percentage P % of altitudes in the area meet a threshold condition (e.g., during step 130). As shown, the threshold condition is met, so the altitude of the mobile device 220 can be estimated for (i) use in determining if the estimated position is accurate, (ii) use in calibrating the pressure sensor of the mobile device 220, or (iii) another use. In FIG. 2B, a second area of possible positions at which the mobile device 220 is located may be determined (e.g., during step 110), and a determination is made as to whether a predefined percentage P % of altitudes in the second area meet the threshold condition (e.g., during step 130). As shown, the threshold condition is not met, so the altitude of the mobile device 220 cannot be estimated for (i) use in determining if the estimated position is accurate, (ii) use in calibrating the pressure sensor of the mobile device 220, or (iii) another use.

Figure 2C:
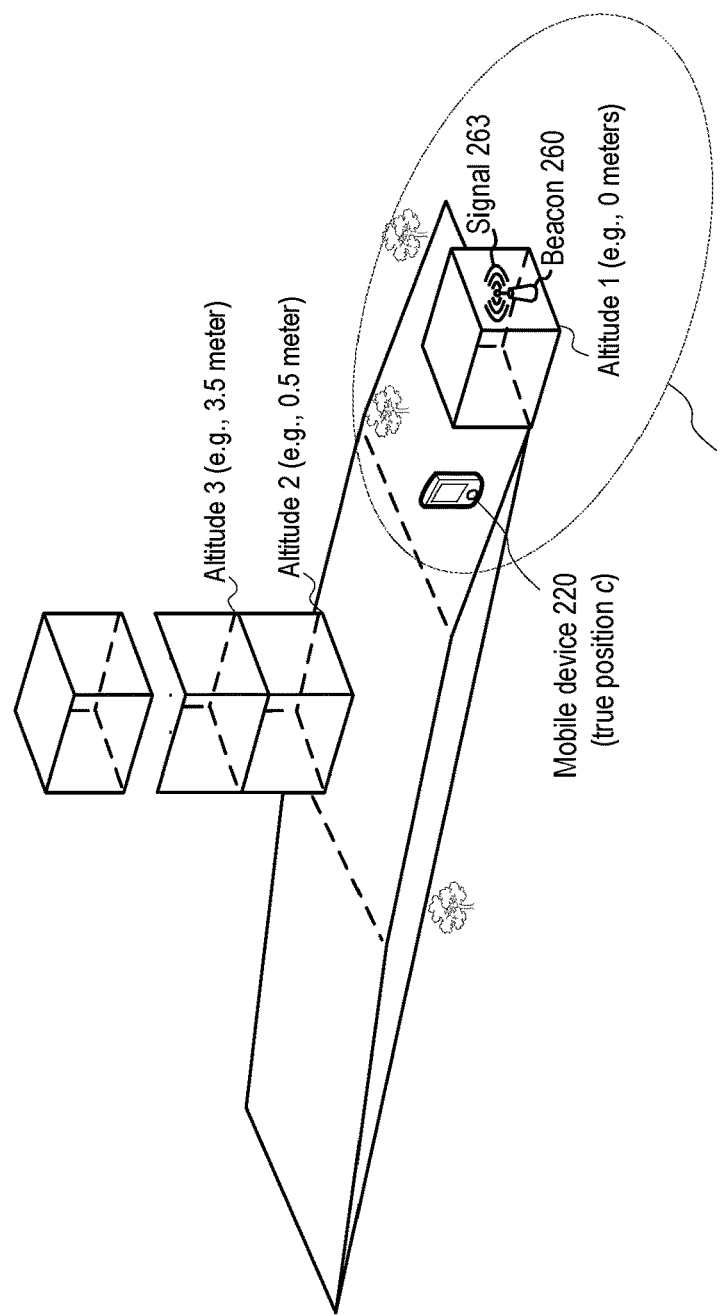
Figure 2D:
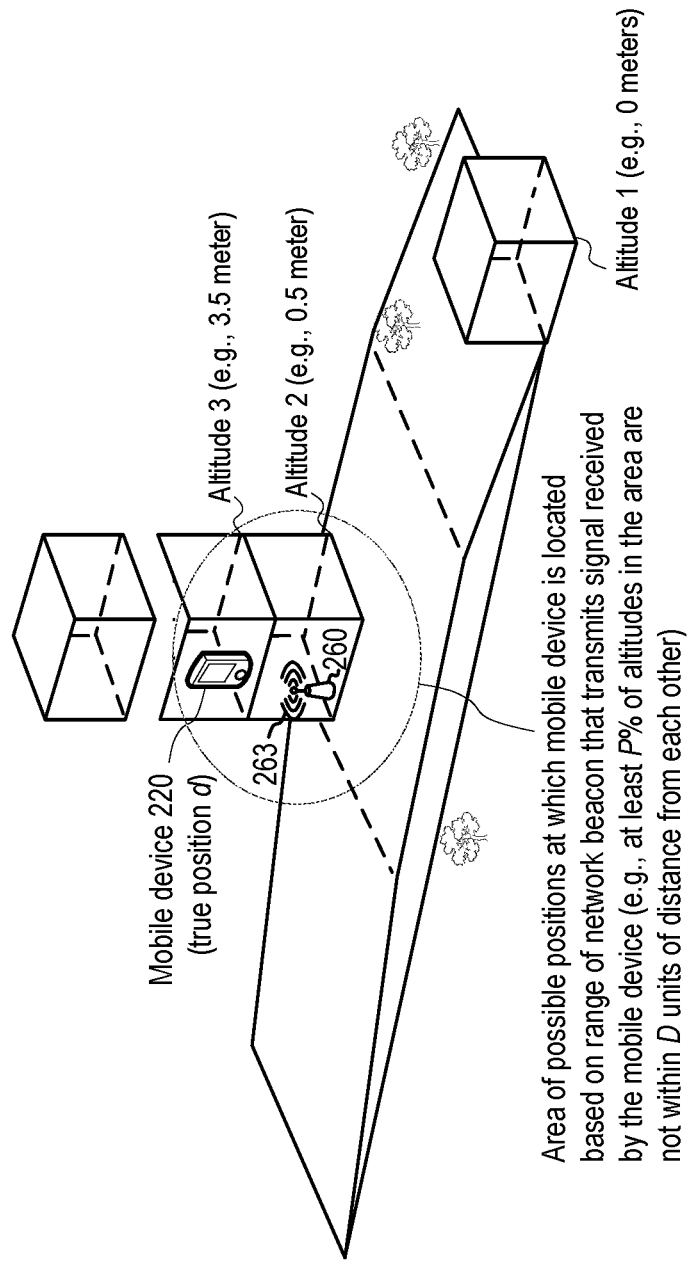

An operational environment 201 illustrated in FIG. 2C and FIG. 2D includes different local beacons 260 for transmitting signals 263 that are received by a mobile device 220 at different times. Each beacon may be associated with a local area within which the signals 263 can be received. Therefore, the local area for a particular beacon can be used as an area of possible positions at which the mobile device 220 is located when the mobile device receives a signal from that beacon (during step 110). The local area may have predefined ranges of altitudes. In FIG. 2C, a determination is made as to whether a predefined percentage P % of altitudes in the local area meet a threshold condition (e.g., during step 130). As shown, the threshold condition is met, so the altitude of the mobile device 220 can be estimated for (i) use in determining if the estimated position is accurate, (ii) use in calibrating the pressure sensor of the mobile device 220, or (iii) another use. In FIG. 2D, a determination is made the threshold condition is not met for the altitudes of the second local area (which may include different possible floors of a building), so the altitude of the mobile device 220 cannot be estimated for (i) use in determining if the estimated position is accurate, (ii) use in calibrating the pressure sensor of the mobile device 220, or (iii) another use. Use of local areas provide a solution that accounts for altitudes of surfaces other than outdoor terrain.

Attention is now drawn to different implementations of step 110, which are shown in FIG. 3 through FIG. 6.

Determine an Area in which a Mobile Device is Known or Believed to Reside (Step 110)

FIG. 3 through FIG. 6 each depict a different process for determining an area in which a mobile device is known or believed to reside.

Figure 3:
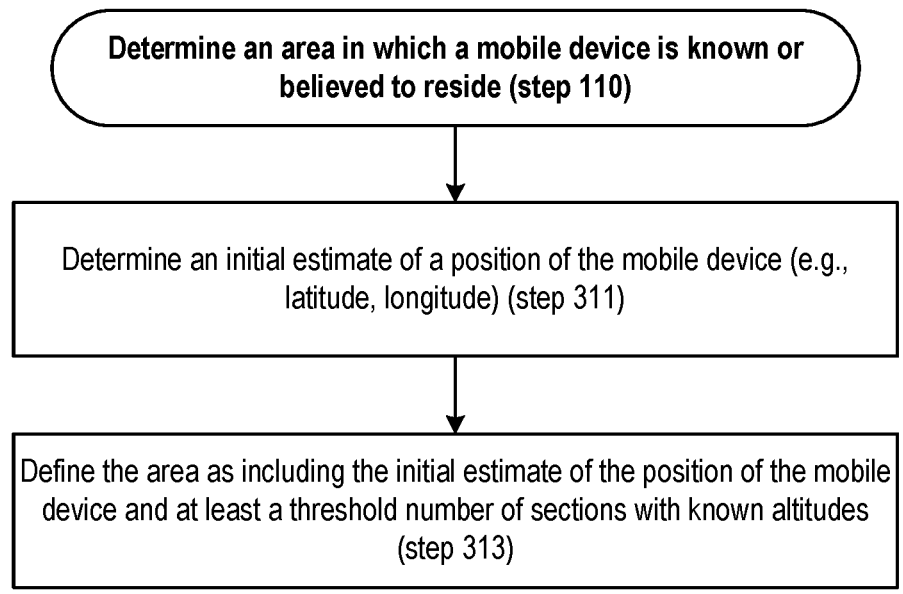
FIG. 3 through FIG. 6 each depict a different process for determining an area in which a mobile device is known or believed to reside.

The process depicted in FIG. 3 includes the steps of: determining an initial estimate of a position of the mobile device (e.g., latitude, longitude) (step 311); and defining the area as including the initial estimate of the position of the mobile device and at least a threshold number of area sections with known altitudes (step 313)—e.g., that are nearest to the initial estimate of the position. One advantage of using the process of FIG. 3 includes needing to only know an initial estimate of the position without having to consider any expected error in the initial estimate of the position (e.g., without needing to compute or consider any location confidence value). Another advantage is ensuring the area is large enough to include all or a threshold number of possible positions of the mobile device. In addition, too few tiles can throw off the statistics in a distribution if one of those tiles happened to have a large error or was an outlier. In one embodiment, selection of sections can also involve selection of only the sections in which the mobile device could reside, and exclusion of inaccessible sections.

Figure 4:
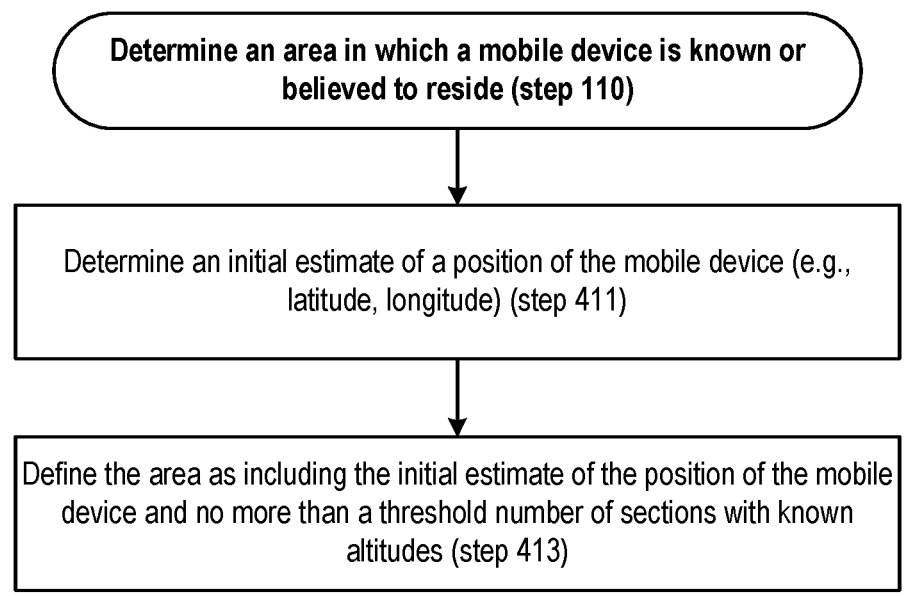

The process depicted in FIG. 4 includes the steps of: determining an initial estimate of a position of the mobile device (e.g., latitude, longitude) (step 411); and defining the area as including the initial estimate of the position of the mobile device and no more than a threshold number of sections with known altitudes (step 413). One advantage of using the process of FIG. 4 includes needing to only know an initial estimate of the position without having to consider any expected error in the initial estimate of the position (e.g., without needing to compute or consider any location confidence value). Another advantage is ensuring the size of the area is not larger than it needs to be for including all or a threshold number of possible positions of the mobile device. In addition, a maximum number of tiles/possible positions reduces computational time. In one embodiment, selection of sections can also involve selection of only the sections in which the mobile device could reside, and exclusion of inaccessible sections.

Figure 5:
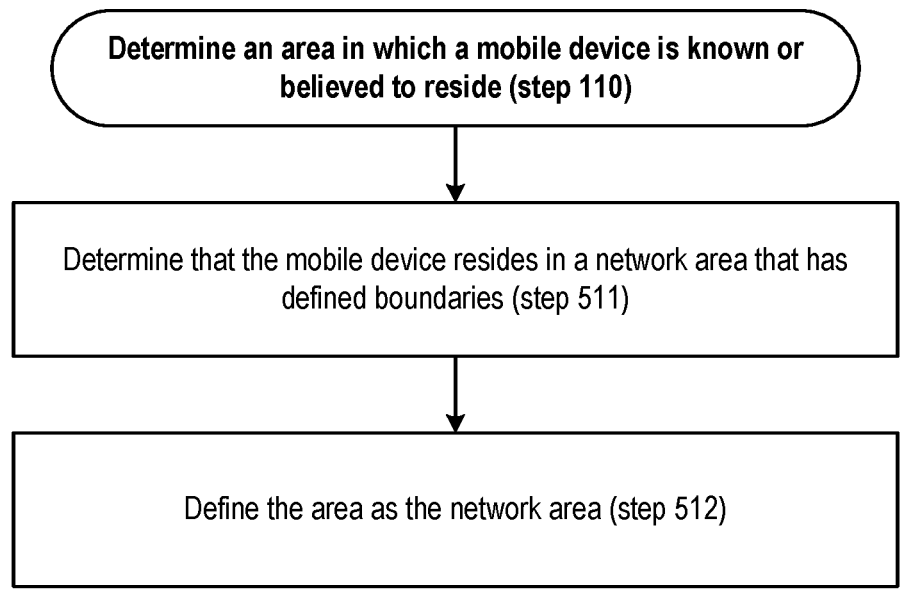

The process depicted in FIG. 5 includes the steps of: determining that the mobile device resides in a network area that has defined boundaries (step 511); and defining the area as the network area (step 512). One advantage of using the process of FIG. 5 includes not needing to compute an initial position of the mobile device to define the area, and instead defining the area based on a topology of a network in which the mobile device is known to reside (e.g., because the mobile device received a signal from the network, is within a geo-fence of the network, or other approach for determining that the mobile device is inside known boundaries of the network). In one embodiment of step 511, the network area is defined by a coverage area of a beacon (e.g., to a coverage threshold), and the mobile device is determined to reside in the network area when the mobile device receives a signal from the beacon. In another embodiment of step 511, the network area is defined by overlapping portions of coverage areas of beacons, and the mobile device is determined to reside in the network area when the mobile device receives a signal from each of the beacons. In yet another embodiment of step 511, the network area is defined by all areas in which the mobile device could connect to a network, and the mobile device is determined to reside in the network area when the mobile device is connected to the network.

Figure 6:
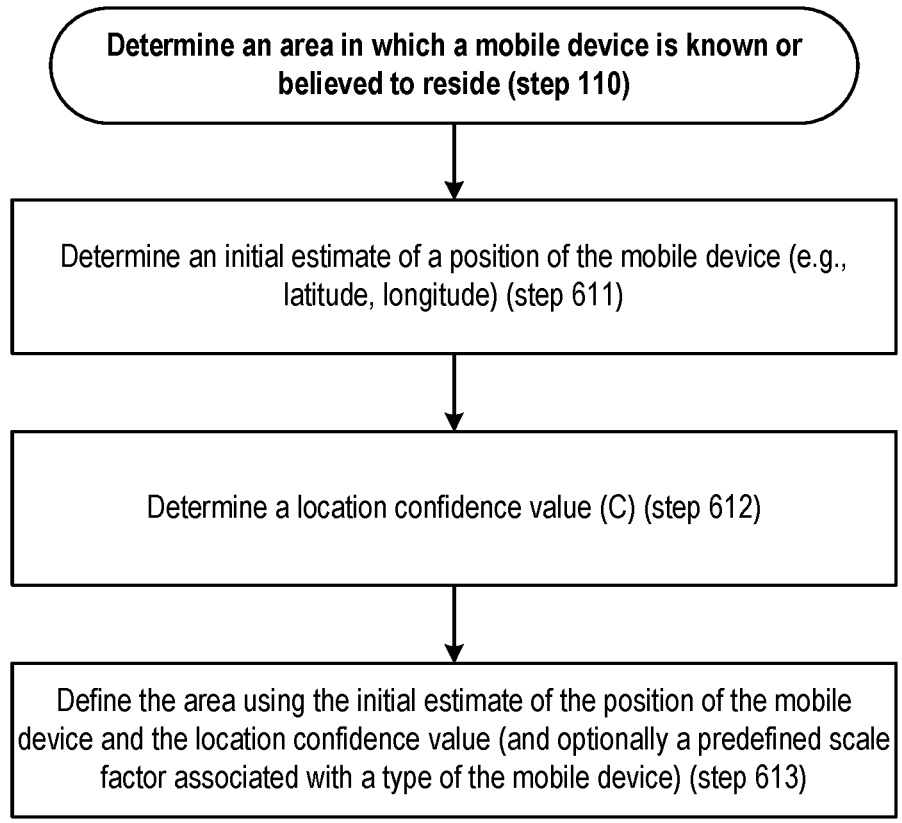

The process depicted in FIG. 6 includes the steps of: determining an initial estimate of a position of the mobile device (e.g., latitude, longitude) (step 611); determining a location confidence value (C) (step 612); and defining the area using the initial estimate of the position of the mobile device and the location confidence value (and optionally a predefined scale factor associated with a type of the mobile device) (step 613). One advantage of using the process of FIG. 6 includes accounting for expected error in an initial estimate of the position of the mobile device, which is used to define the area so it is highly likely the area includes all or a threshold number of possible positions of the mobile device. Different implementations of step 613 are shown in FIG. 7 through FIG. 10, which are described below.

The location confidence value may be defined as the expected error in an estimated position, which may be based upon the individual errors feeding into the process used for determining the estimated position. For instance, the location confidence value is small for an estimated position determined using three or more distributed GNSS signals received by a mobile device with unobstructed views of the GNSS satellites from which the signals were received (i.e., the estimated position is considered to be highly-accurate). Alternatively, the location confidence value is large for an estimated position determined using a GNSS signal received by a mobile device with an obstructed view of the GNSS satellite from which the signal was received (i.e., the estimated position is considered to have error due to that signal).

The scale factor may be a predefined number (e.g., a number greater than 1, or a number less than 1). In one embodiment, the scale factor S is determined a priori by determining, for one or a variety of location morphologies, estimated positions of the mobile device (or a representative model device of the mobile device) and location confidence values for the estimated positions when the mobile device or model thereof is at different surveyed locations (e.g., locations with known position coordinates) in the one type or a variety of location morphologies. Examples of location morphologies include dense urban, urban, suburban, and rural morphologies. For each estimated position and corresponding location confidence value, a determination is made as to whether the estimated position is within the corresponding location confidence value from the corresponding surveyed location at which the estimated position was determined. A percentage of times when the estimated positions are within their corresponding location confidence values from their corresponding surveyed locations is determined (e.g., 60%). A desired percentage is determined (e.g., 90%). A determination is made as to whether the determined percentage of times meets or exceeds the desired percentage. If not, the scale factor is determined to be a number that, when multiplied to each of the location confidence values results in a percentage of times (e.g., ≥90%) when the estimated positions are within a product of their corresponding location confidence values and the scale factor from their corresponding surveyed locations that meets or exceeds the desired percentage (90%). Once the scale factor is computed for the mobile device, or for a representative model of the mobile device, the scale factor is stored for later use. In one embodiment that uses a scale factor, a single scale factor is determined a priori for the mobile device. In another embodiment that uses a scale factor, different scale factors are determined a priori for different morphologies (e.g., a first scale factor for a first type of morphology, ..., and an nth scale factor for an nth type of morphology, for different types of morphologies like dense urban, urban, suburban, rural, or other morphologies).

Attention is now drawn to different implementations of step 613, which are shown in FIG. 7 through FIG. 10.

Defining an Area Using an Initial Estimate of a Position of a Mobile Device and a Location Confidence Value (Step 613)

FIG. 7 through FIG. 10 each depict a different process for defining an area using an initial estimate of a position of a mobile device and a location confidence value during step 613.

Figure 7:
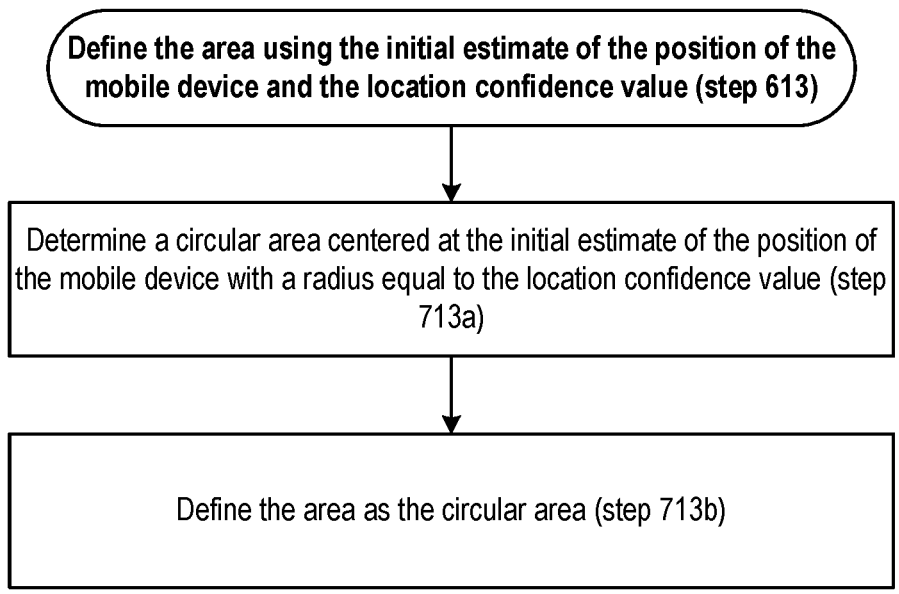
FIG. 7 through FIG. 10 each depict a different process for defining an area using an initial estimate of a position of a mobile device and a location confidence value.

The process depicted in FIG. 7 includes the steps of: determining a circular area centered at the initial estimate of the position of the mobile device with a radius equal to the location confidence value (step 713*a*); and defining the area as the circular area (step 713*b*). One advantage of using the process of FIG. 7 includes defining an area based on information that is typically readily available, such as the initial estimate of the position and the location confidence value.

Figure 8:
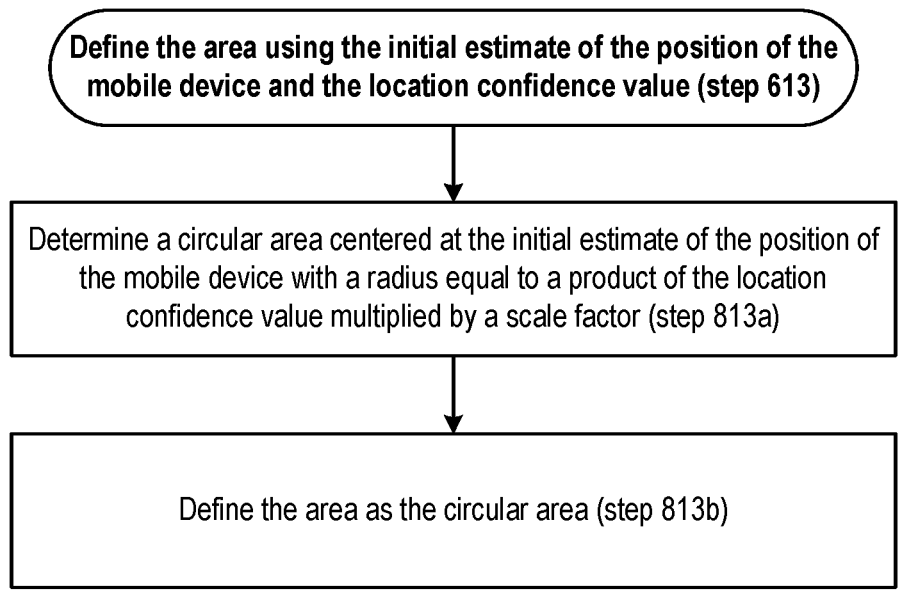

The process depicted in FIG. 8 includes the steps of: determining a circular area centered at the initial estimate of the position of the mobile device with a radius equal to a product of the location confidence value multiplied by a scale factor (step 813*a*); and defining the area as the circular area (step 813*b*). One advantage of using the process of FIG. 8 includes defining an area based on a scale factor that may be specific to the type or model of mobile device, or that may be specific to characteristics of a geographic area.

Figure 9:
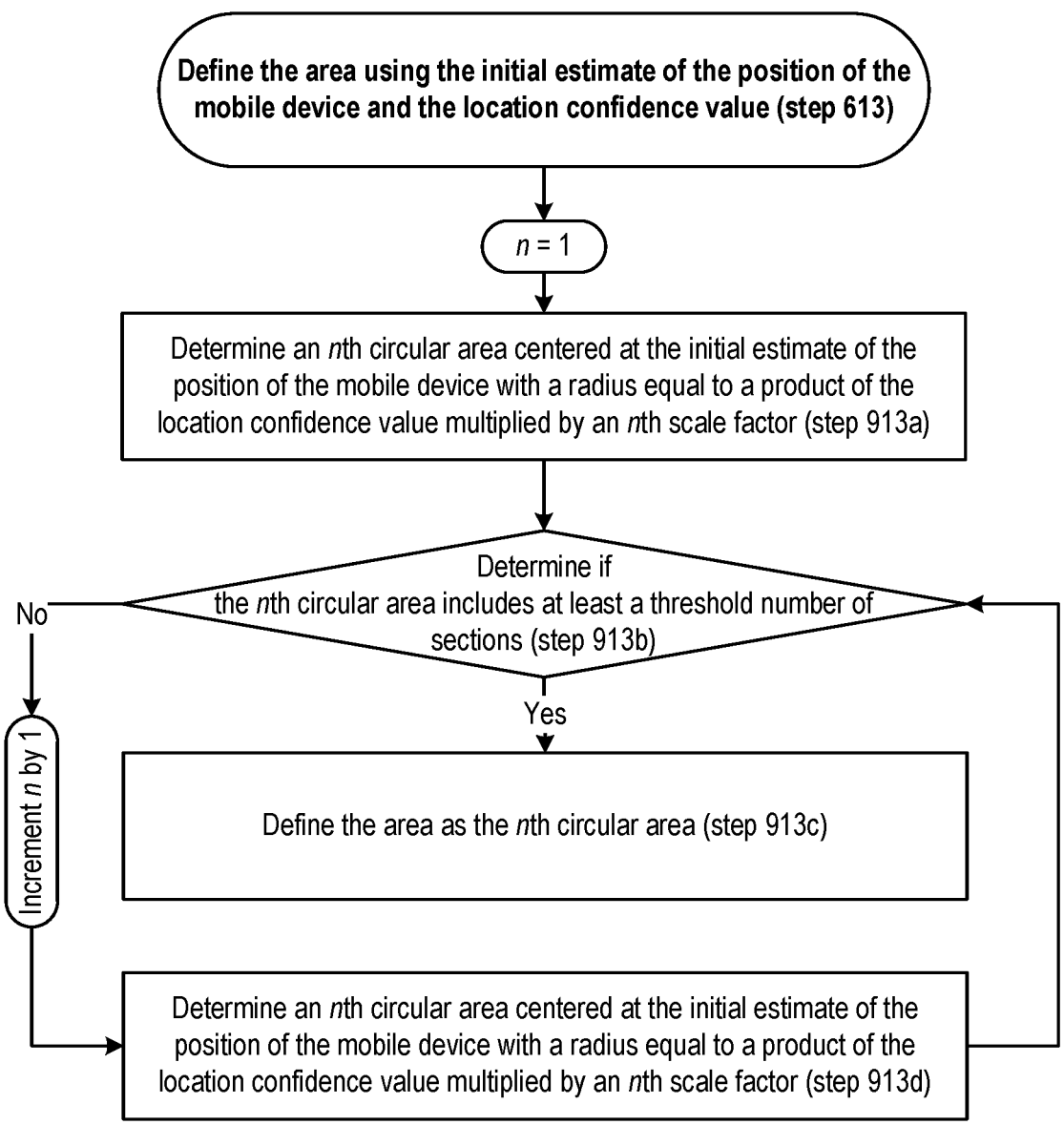

The process depicted in FIG. 9 includes the steps of: determining a circular area centered at the initial estimate of the position of the mobile device with a radius equal to a product of the location confidence value multiplied by a scale factor (step 913*a*); determining if the circular area includes at least a threshold number of sections (step 913*b*); if the circular area includes at least the threshold number of sections, defining the area as the circular area (step 913*c*); and if the circular area does not include at least the threshold number of sections, determining a new circular area centered at the initial estimate of the position of the mobile device with a radius equal to a product of the location confidence value multiplied by another scale factor (step 913*d*), and then repeating step 913*b* using the new circular area. In one embodiment, the first scale factor is the same scale factor as discussed earlier, and any other scale factors are larger than the first scale factor. In another embodiment, the scale factors are a series of increasing numbers that were not predetermined for the type of mobile device. One advantage of using the process of FIG. 9 includes having the ability to adjust the size of the area based on a particular condition (e.g., whether a candidate area includes a preferred number of sections).

Figure 10:
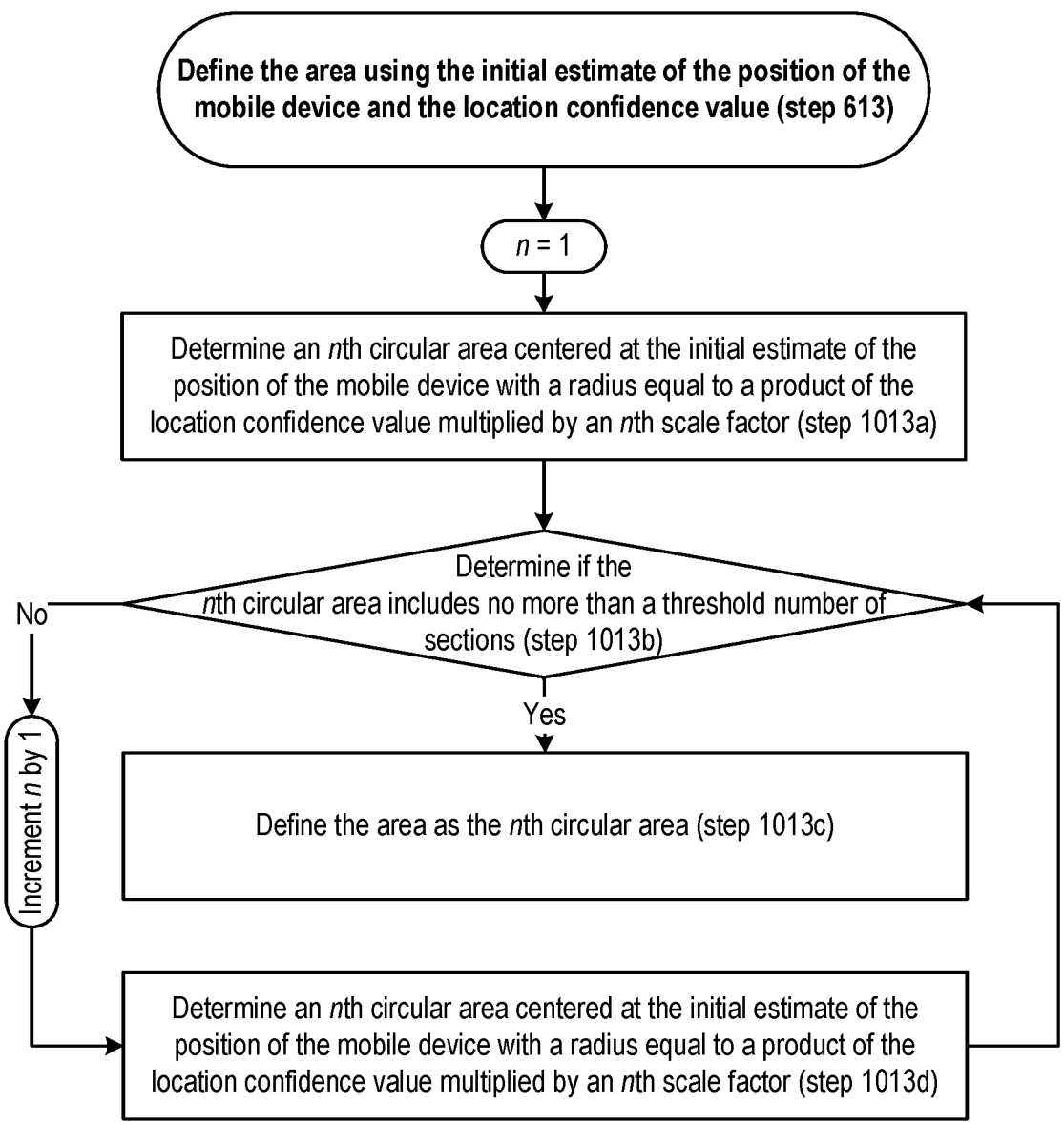

The process depicted in FIG. 10 includes the steps of: determining a circular area centered at the initial estimate of the position of the mobile device with a radius equal to a product of the location confidence value multiplied by a scale factor (step 1013*a*); determining if the circular area includes no more than a threshold number of sections (step 1013*b*); if the circular area includes no more than the threshold number of sections, defining the area as the circular area (step 1013*c*); and if the circular area include at least the threshold number of sections, determining a new circular area centered at the initial estimate of the position of the mobile device with a radius equal to a product of the location confidence value multiplied by another scale factor (step 1013*d*), and then repeating step 1013*b* using the new circular area. In one embodiment, the first scale factor is the same scale factor as discussed earlier, and any other scale factors are smaller than the first scale factor. In another embodiment, the scale factors are a series of decreasing numbers that were not predetermined for the type of mobile device. One advantage of using the process of FIG. 10 includes having the ability to adjust the size of the area based on a particular condition (e.g., whether a candidate area includes no more than a preferred number of sections).

Figure 11:
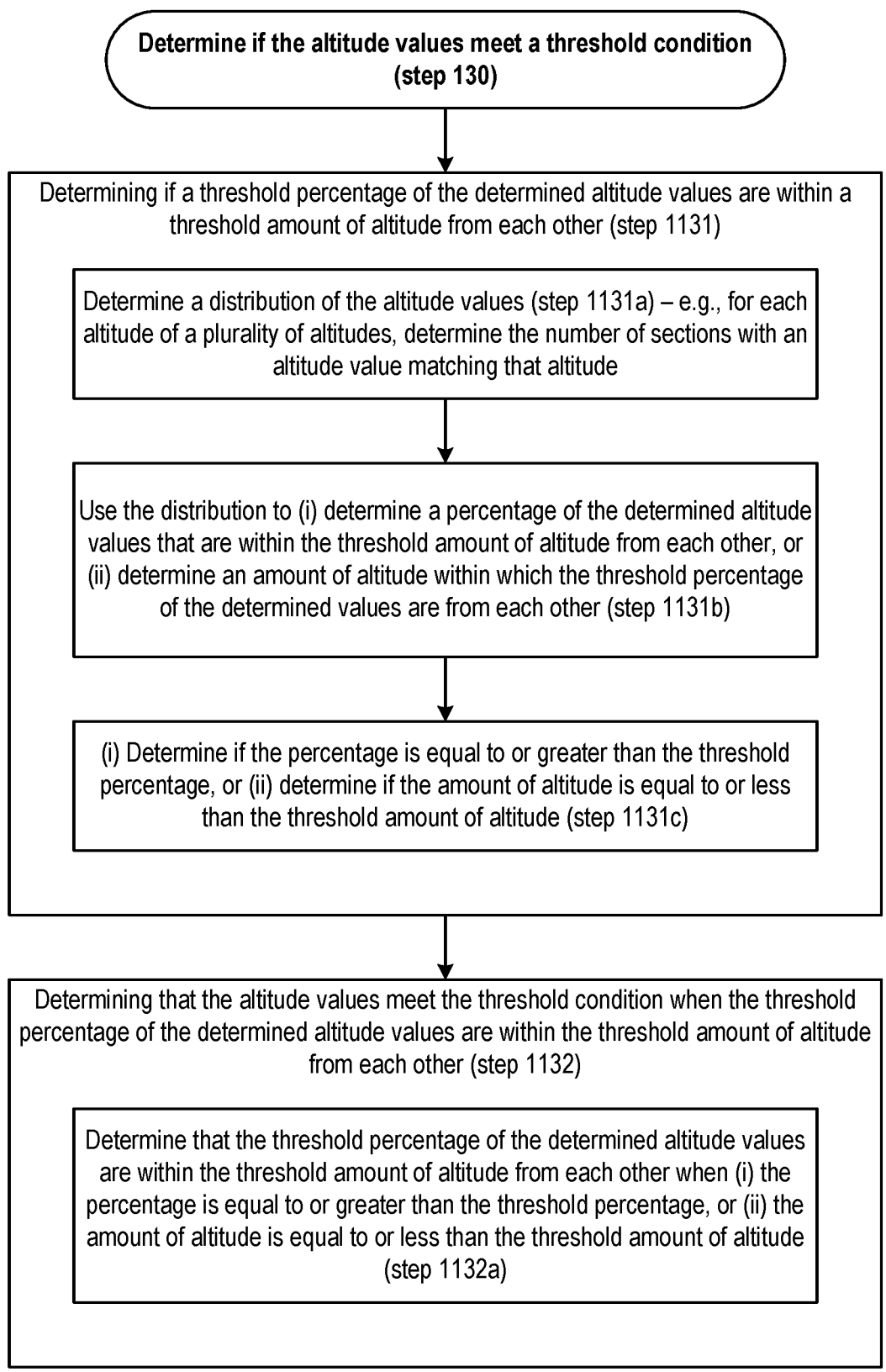
FIG. 11 and FIG. 12 each depict a process for determining if altitude values of an area meet a threshold condition.
Figure 12:
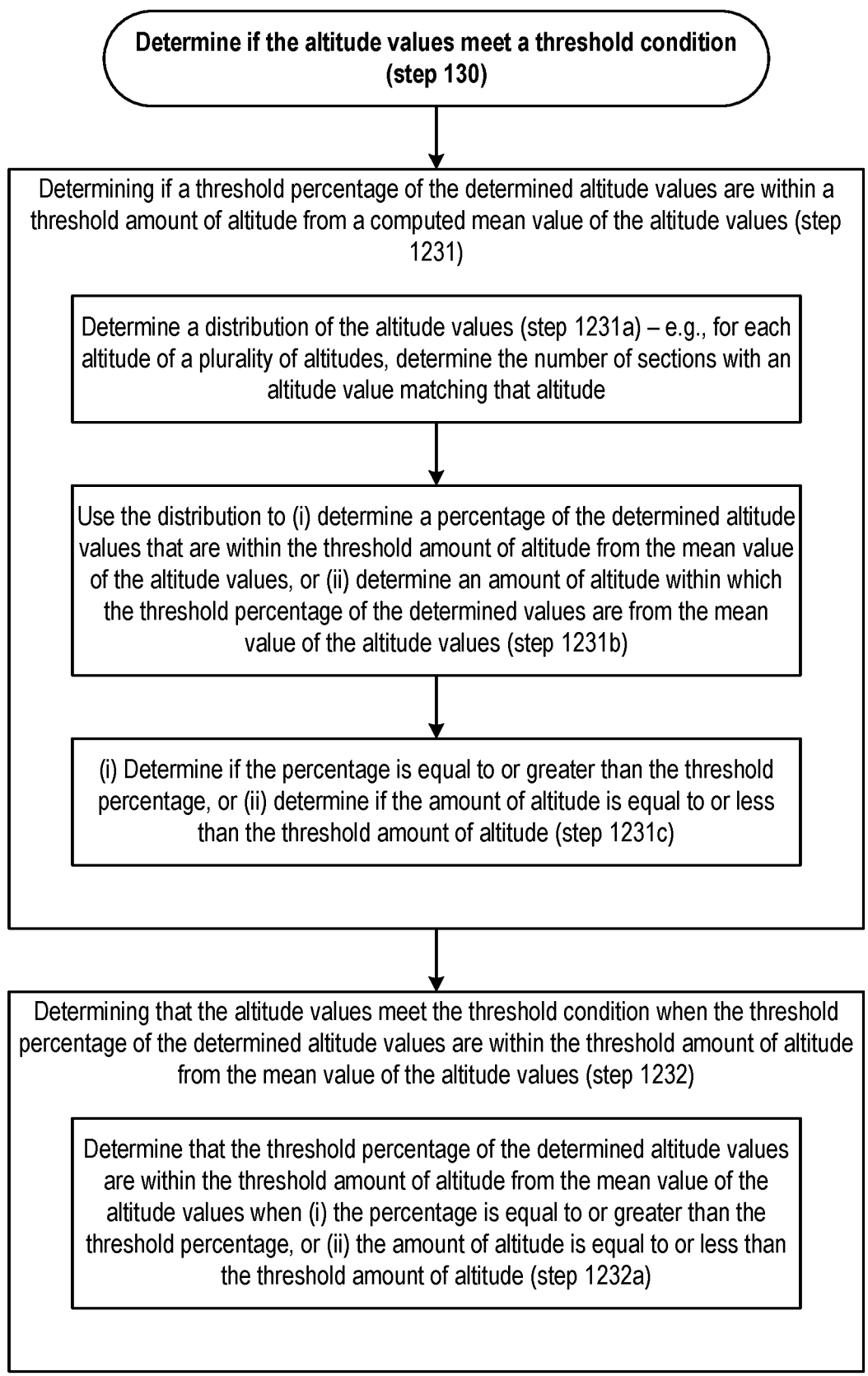

Attention is now drawn to different implementations of step 130, which are shown in FIG. 11 and FIG. 12.

Determine if the Altitude Values Meet a Threshold Condition (Step 130)

FIG. 11 and FIG. 12 each depict a process for determining if altitude values of an area meet a threshold condition during step 130.

The process depicted in FIG. 11 includes the steps of: determining if a threshold percentage of the determined altitude values are within a threshold amount of altitude from each other (step 1131); and determining that the altitude values meet the threshold condition when the threshold percentage of the determined altitude values are within the threshold amount of altitude from each other (step 1132). One advantage of using the process of FIG. 11 includes ensuring the altitude variation in an area meets a threshold condition (e.g., an altitude difference amount across certain sections is within an amount of tolerated altitude error or fraction thereof, where less steps are needed than using the mean, median or value-of-interest value of FIG. 12).

In a first embodiment of steps 1131 and 1132, a distribution of the altitude values is determined (step 1131*a*). The distribution is used to determine a percentage of the determined altitude values that are within the threshold amount of altitude from each other (step 1131*b*). A determination is made as to whether the percentage is equal to or greater than the threshold percentage (step 1131*c*). The threshold percentage of the determined altitude values are determined to be within the threshold amount of altitude from each other when the percentage is equal to or greater than the threshold percentage (step 1132*a*).

In a second embodiment of steps 1131 and 1132, a distribution of the altitude values is determined (step 1131*a*). The distribution is used to determine an amount of altitude within which the threshold percentage of the determined values are from each other (step 1131*b*). A determination is made as to whether the amount of altitude is equal to or less than the threshold amount of altitude (step 1131*c*). The threshold percentage of the determined altitude values are determined to be within the threshold amount of altitude from each other when the amount of altitude is equal to or less than the threshold amount of altitude (step 1132*a*).

The process depicted in FIG. 12 includes the steps of: determining if a threshold percentage of the determined altitude values are within a threshold amount of altitude from a computed mean value of the altitude values (step 1231); and determining that the altitude values meet the threshold condition when the threshold percentage of the determined altitude values are within the threshold amount of altitude from the mean value of the altitude values (step 1232). One advantage of using the process of FIG. 12 includes ensuring the altitude variation in an area meets a threshold condition (e.g., an altitude difference between each section from a group of sections and a mean of altitudes is within an amount of tolerated altitude error or fraction thereof, wherein a cumulative distribution function can be used for analysis after the mean value is computed).

In a first embodiment of steps 1231 and 1232, a distribution of the altitude values is determined (step 1231*a*). The distribution is used to determine a percentage of the determined altitude values that are within the threshold amount of altitude from the mean value of the altitude values (step 1231*b*). A determination is made as to whether the percentage is equal to or greater than the threshold percentage (step 1231*c*). The threshold percentage of the determined altitude values are determined to be within the threshold amount of altitude from the mean value of the altitude values when the percentage is equal to or greater than the threshold percentage (step 1232*a*).

In a second embodiment of steps 1231 and 1222, a distribution of the altitude values is determined (step 1231*a*). The distribution is used to determine an amount of altitude within which the threshold percentage of the determined values are from the mean value of the altitude values (step 1231*b*). A determination is made as to whether the amount of altitude is equal to or less than the threshold amount of altitude (step 1231*c*). The threshold percentage of the determined altitude values are determined to be within the threshold amount of altitude from the mean value of the altitude values when the amount of altitude is equal to or less than the threshold amount of altitude (step 1232*a*).

One example of determining a distribution of the altitude values in FIG. 11 and FIG. 12 includes: for each altitude of a plurality of altitudes, determining the number of sections with an altitude value matching that altitude.

The process of FIG. 12 is depicted as using a mean. It is noted that mean-subtracted values could be used instead, as illustrated below in FIG. 13A through FIG. 13E, which are discussed below. If the altitudes determined from the tiles or possible fixes within a contour are not equally sized, then the mean can optionally be weighted. For example, for altitudes a_i and sizes s_i, the mean altitude is:

$$a_{average} = \frac{a_0 s_0 + a_1 s_1 + \ldots + a_n s_n}{s_0 + s_1 + \ldots + s_n}.$$

Illustration of a Process for Determining when an Altitude of a Mobile Device can be Estimated for Use in Different Applications For purposes of illustration, FIG. 13A through FIG. 13E depict a specific approach for determining when an altitude of a mobile device can be estimated. Initially, an API is queried for an estimated position (e.g., latitude and longitude) of a mobile device along with a location confidence C associated with the estimated position. Optionally, a scale factor S is retrieved from storage, or a default value for S is 1.

Figure 13A:
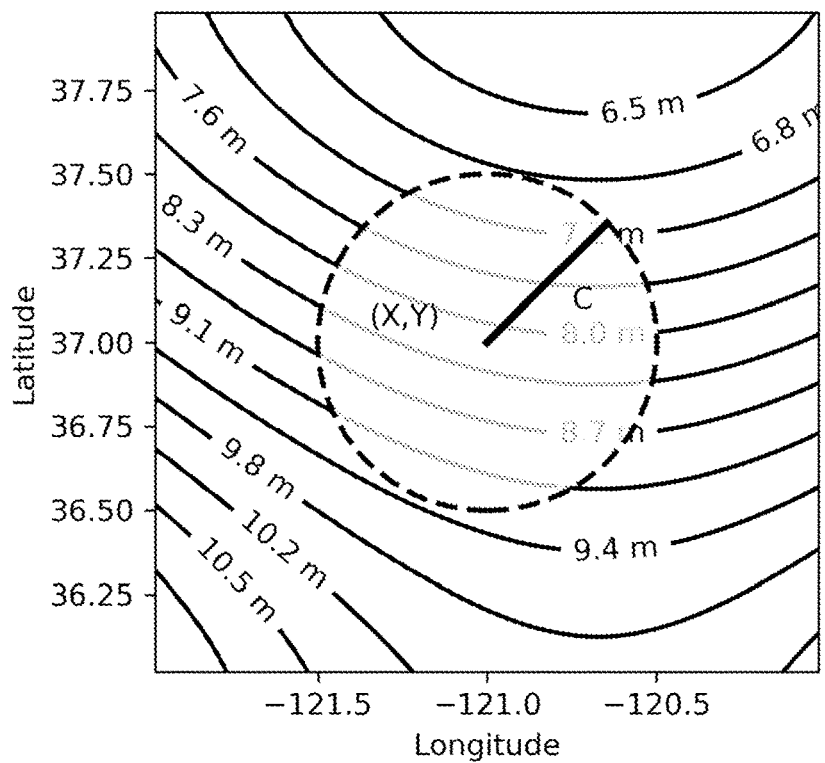
FIG. 13A through FIG. 13E illustrate one approach for determining when an estimated altitude of a mobile device can be used for calibration or location determination.

If location confidence C is given as a radial distance, the estimated position and the location confidence C are used to define an area of possible positions of the mobile device within C*S from the estimated position (e.g., see FIG. 13A). If the location confidence C is given as a polygon, then the estimated position and the location confidence C are used to define an area of possible positions of the mobile device within the polygon scaled by S.

Figure 13B:
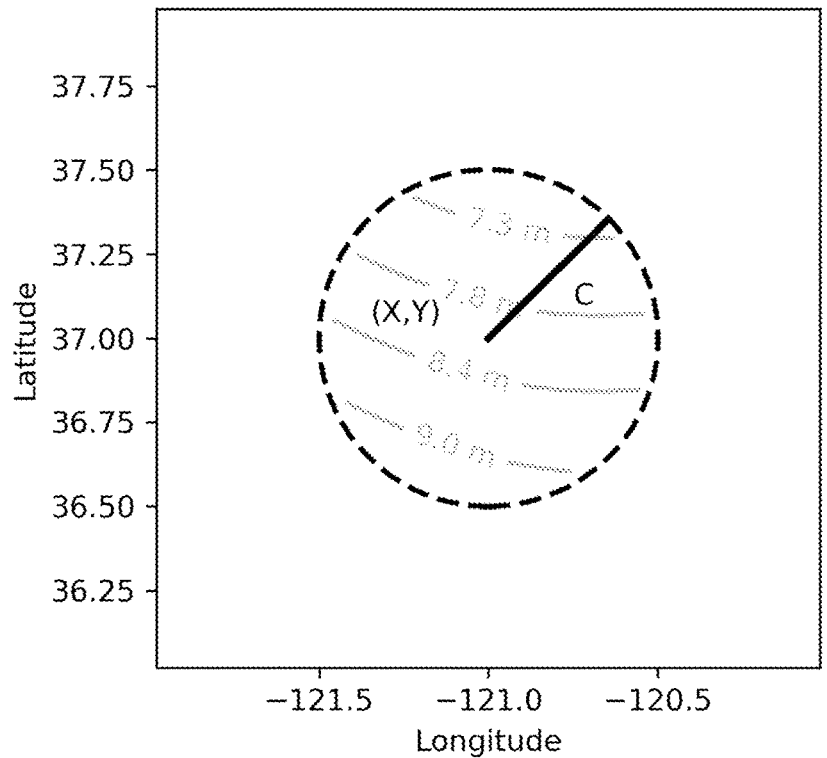

A plurality of tiles within the defined area are determined (e.g., see FIG. 13B). By way of example, the tiles may be identified as having ranges of latitude and longitude within the area of possible positions. Optionally, a determination is made as to whether at least a minimum or no more than a maximum number of tiles are included in the area, and if not, the scale factor S is respectively increased or decreased until at least the minimum or no more than the maximum number of tiles are included in the area.

From the area of possible positions, a query is made for terrain altitudes of all tiles in the area. The query may be to a database of altitudes.

Figure 13C:
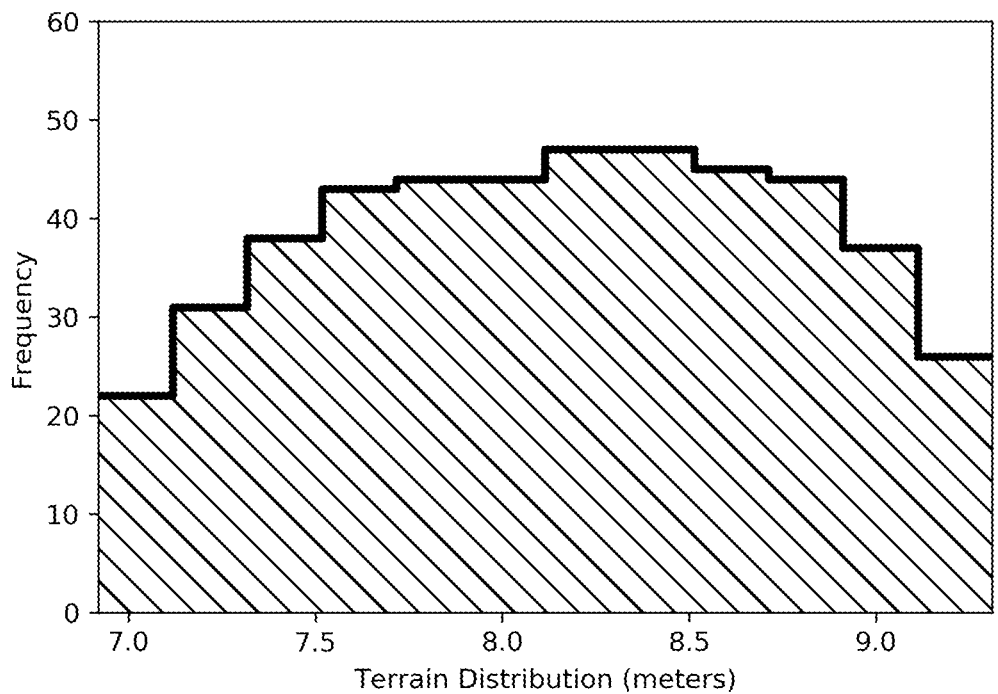
Figure 13D:
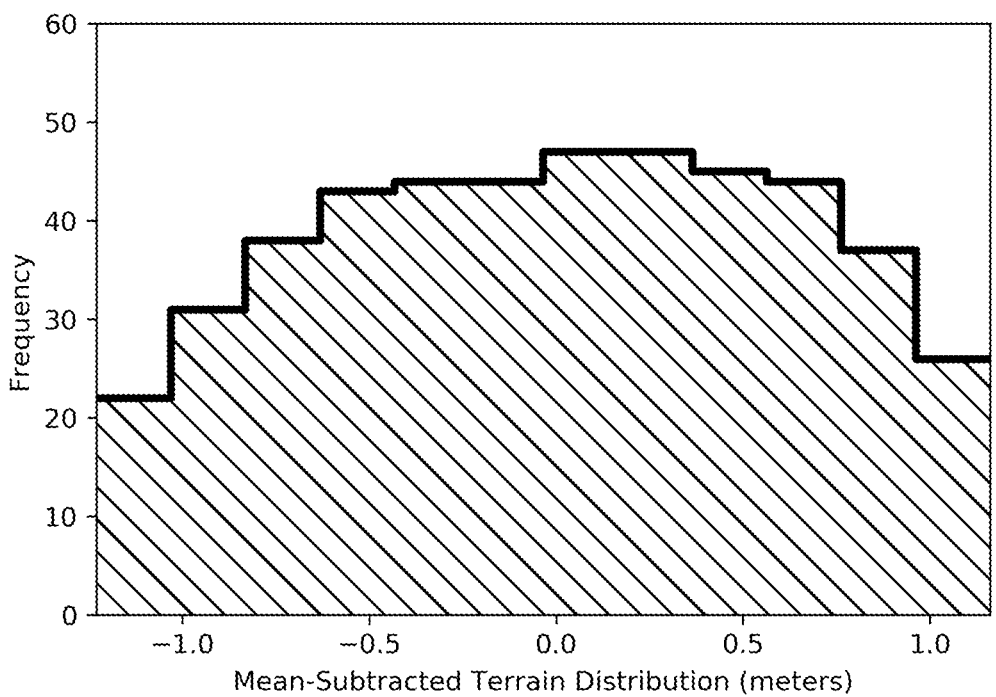
Figure 13E:
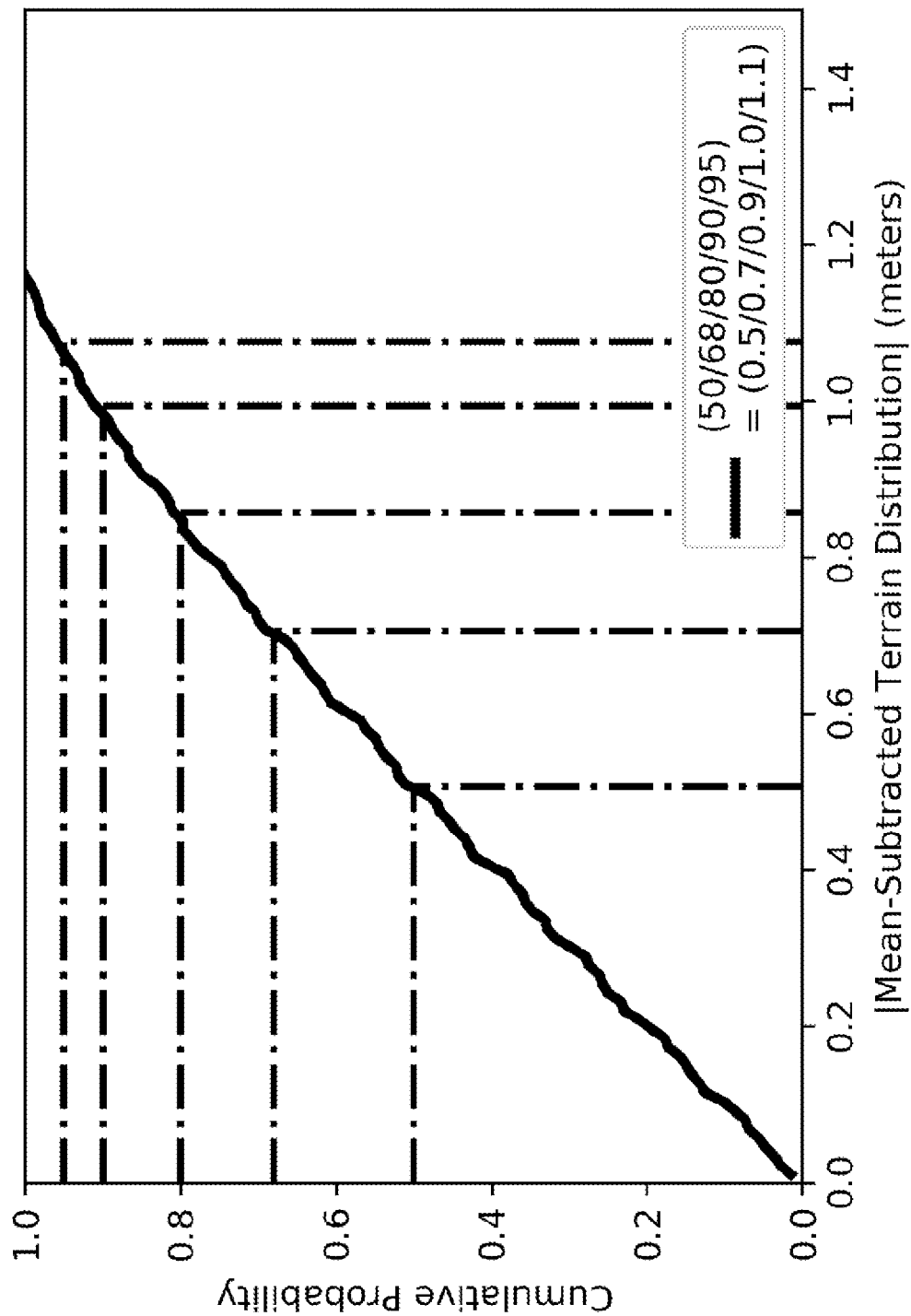

A distribution of the terrain altitudes is determined (e.g., see FIG. 13C). Optionally, a mean-subtracted distribution is determined (e.g., see FIG. 13D). From either of these distributions, a cumulative distribution function (CDF) of key values is computed, such as 10%, 30%, 50%, 68%, 80% and 90% (e.g., see FIG. 13E). The key values from the CDF are then used to determine if the area is flat enough such that an estimated altitude of the mobile device can be used to estimate the location of the mobile device or to calibrate the pressure sensor of the mobile device. For example, if the spread or distribution of terrain altitude falls within a predefined distance D a predefined percentage P % of the time, then the area is flat enough. Otherwise, the area is not flat enough. As shown in FIG. 13E, 90% of the terrain altitudes are nearly 1.5 meters from each other, and only about 60% of the terrain altitudes are within 1 meter from each other. If the distance D is 1 meter, and the percentage P is 90%, the area would not be flat enough.

In alternative embodiments of the process in FIG. 12 and FIG. 13A through FIG. 13E, a median or value-of-interest can be used instead of a mean.

Calibration

One approach for calibrating a pressure sensor of a mobile device is described below. Initially, an estimated altitude $h_{mobile}$ is computed as:

$$h_{mobile} = h_{ref} \mp \frac{RT_{remote}}{gM} \ln\left(\frac{P_{ref}}{P_{mobile}}\right), \quad \text{(Equation 3)}$$

where $P_{mobile}$ is the estimate of pressure at the location of the mobile device, $P_{ref}$ is an estimate of pressure at a reference location, $T_{remote}$ is an estimate of ambient temperature (e.g., in Kelvin), $h_{ref}$ is the known altitude of the reference location, g corresponds to acceleration due to gravity, R is a gas constant, and M is molar mass of air (e.g., dry air or other). To calibrate the pressure sensor of the mobile device, the aim is to determine an adjustment to the value of $P_{mobile}$ such that $h_{mobile}$ is within a tolerated amount of distance from the true altitude of the mobile device, $h_{truth}$.

During calibration, a representative altitude value of the area in which the mobile device is expected to reside can be assigned as the true altitude of the mobile device, $h_{truth}$. Alternatively, the representative altitude value adjusted by a typical height at which the mobile device is likely to be held above the ground can be assigned as the true altitude of the mobile device, $h_{truth}$. Examples of representative altitude values are described earlier with respect to step 150a of FIG. 1.

Once the true altitude of the mobile device, $h_{truth}$, is determined, a calibration value C needed to adjust the estimate of pressure at the location of the mobile device, $P_{mobile}$, is determined using the formula below:

$$h_{truth} = h_{ref} \mp \frac{RT}{gM} \ln\left(\frac{P_{reference}}{P_{mobile} + C}\right). \quad \text{(Equation 4)}$$

Alternatively, differentiating pressure with respect to height can be used to help determine the calibration value C. The following relationship:

$$P_{at\ h_1} = P_{at\ h_2} \exp\left(\frac{gM(h_2 - h_1)}{RT}\right), \quad \text{(Equation 5)}$$

can be used to derive the following formula:

$$\frac{dP}{dh} = \frac{gMP}{RT} \approx 0.034\frac{P}{T}. \quad \text{(Equation 6)}$$

If a pressure measurement of by the mobile device is P=101000 Pa and ambient temperature is T=300 K, the formula of Equation 6 results in dP/dh≈11.5 Pa/m. The values of P and T are reasonable assumptions for nominal weather, and the scale factor of 11.5 Pa/m can range between ~9-12 Pa/m if the weather gets cooler or hotter. This means for every meter adjustment to be made to get $h_{truth}$ to align with $h_{mobile}$ the calibration value C can be adjusted by 11.5 Pa. In this example, if $h_{mobile}$=12.0 m and $h_{truth}$=8 m, the difference in altitude can be scaled by 11.5 Pa/m to get the difference in pressure, or C=46 Pa as shown below:

$$C = (h_{truth} - h_{phone}) \times \frac{dP}{dh} = (12 - 8) \times 11.5 = 46. \quad \text{(Equation 7)}$$

Technical Benefits

Processes described herein improve the fields of calibration and location determination by permitting more opportunities to calibrate a pressure sensor of a mobile device compared to other approaches. Calibration of pressure sensors of mobile devices is critical for providing useful measurements of pressure that are relied on to estimate an altitude of the mobile device. In particular, processes described herein can be used to determine suitable circumstances for calibration that would be overlooked by other approaches when the exact altitude of the mobile device is unknown. The additional opportunities to calibrate enable more accurate and reliable estimated positions that shorten emergency response times or otherwise improve the usefulness of estimated positions. The additional opportunities for calibration improve the use of equipment that is susceptible to producing unreliable data (e.g., a pressure sensor of a mobile device producing pressure data with lower-than-desirable accuracy due to drift or inherent resolution of the equipment) by providing for improved calibration of that equipment and data the equipment produces. As a result of the processes described herein, new and useful data is created, including data that confirms whether an estimated altitude is suitable for particular uses (e.g., calibration of a pressure sensor or estimation of a position of a mobile device). Prior approaches that do not produce this data prior to calibration or position determination are more likely to calibrate or estimate positions with less accuracy.

Other Aspects

Any method (also referred to as a "process" or an "approach") described or otherwise enabled by disclosure herein may be implemented by hardware components (e.g., machines), software modules (e.g., stored in machine-readable media), or a combination thereof. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media (e.g. one or more non-volatile or volatile storage media, removable or non-removable media, integrated circuit media, magnetic storage media, optical storage media, or any other storage media, including RAM, ROM, and EEPROM) that may be patented under the laws of the jurisdiction in which this application is filed, but does not include machine-readable media that cannot be patented under the laws of the jurisdiction in which this application is filed. Systems that include one or more machines and one or more non-transitory machine-readable media are also contemplated herein. One or more machines that perform or implement, or are configured, operable or adapted to perform or implement operations comprising the steps of any methods described herein are also contemplated herein. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

Figure 14:
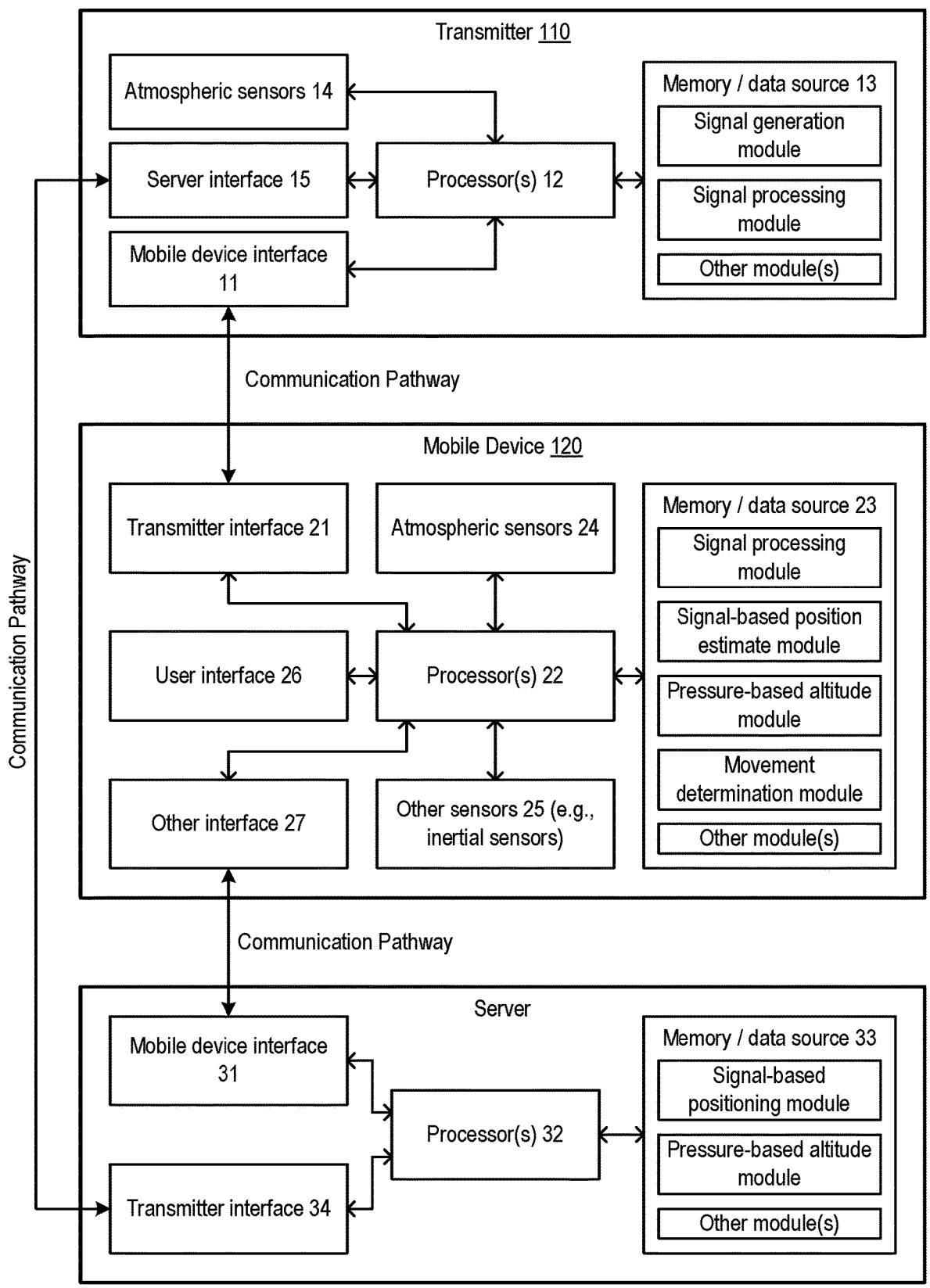
FIG. 14 illustrates components of a transmitter, a mobile device, and a server.

FIG. 14 illustrates components of a transmitter, a mobile device, and a server. Examples of communication pathways are shown by arrows between components.

By way of example in FIG. 14, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example FIG. 14, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 14, the server may include: a mobile device interface 21 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Methods described herein that use a mean can alternatively use a median or value-of interest.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. Pub. No. 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

This application relates to the following related application(s): U.S. Pat. Appl. No. 62/676,264, filed 24 May 2018, entitled SYSTEMS AND METHODS FOR DETERMINING WHEN AN ESTIMATED ALTITUDE OF A MOBILE DEVICE CAN BE USED FOR CALIBRATION OR LOCATION DETERMINATION. The content of each of the related application(s) is hereby incorporated by reference herein in its entirety.

The invention claimed is:

1. A method comprising:
   determining an area in which a mobile device is expected to reside;
   for each section of a plurality of sections in the area, determining an altitude value of that section;
   determining that the determined altitude values meet a threshold condition when a threshold percentage of the determined altitude values is within a threshold amount of altitude from a computed mean or median value of the determined altitude values by determining a distribution of the determined altitude values, using the distribution to determine a percentage of the determined altitude values that are within the threshold amount of altitude from the computed mean or median value of the determined altitude values, and determining that the threshold percentage of the determined altitude values are within the threshold amount of altitude from the computed mean or median value of the determined altitude values when the percentage is equal to or greater than the threshold percentage;
   upon determining that the determined altitude values meet the threshold condition, measuring a pressure by a pressure sensor of the mobile device, and determining a three-dimensional position of the mobile device using an estimated altitude of the mobile device determined using the pressure measured by the pressure sensor; and
   calibrating the pressure sensor of the mobile device using the estimated altitude and a representative altitude value for the area, wherein the representative altitude value is determined using the determined altitude values.

2. The method of claim 1, wherein the method further comprises:
   determining that the estimated altitude is accurate by determining that the estimated altitude is within a threshold error value from the representative altitude value for the area.

3. The method of claim 1, wherein determining the area in which the mobile device is expected to reside comprises:
   determining an initial estimate of a position of the mobile device; and
   defining the area as including the initial estimate of the position of the mobile device and at least a threshold number of sections with known altitudes.

4. The method of claim 1, wherein determining the area in which the mobile device is expected to reside comprises:
   determining an initial estimate of a position of the mobile device; and
   defining the area as including the initial estimate of the position of the mobile device and no more than a threshold number of sections with known altitudes.

5. The method of claim 1, wherein determining the area in which the mobile device is expected to reside comprises:
   determining that the mobile device resides in a network area that has defined boundaries; and
   defining the area as the network area.

6. The method of claim 1, wherein determining the area in which the mobile device is expected to reside comprises:
   determining an initial estimate of a position of the mobile device;
   determining a location confidence value; and
   defining the area using the initial estimate of the position of the mobile device and the location confidence value.

7. The method of claim 6, wherein defining the area comprises:
determining a circular area centered at the initial estimate of the position of the mobile device with a radius equal to the location confidence value; and
defining the area as the circular area.

8. The method of claim 6, wherein defining the area comprises:
determining a circular area centered at the initial estimate of the position of the mobile device with a radius equal to a product of the location confidence value multiplied by a scale factor; and
defining the area as the circular area.

9. One or more non-transitory machine-readable media embodying program instructions that, when executed by one or more machines, cause the one or more machines to implement the method of claim 1.

10. A system for calibration or location determination of a mobile device, the system comprising one or more machines configured to perform the method of claim 1.

11. A method comprising:
determining an area in which a mobile device is expected to reside;
for each section of a plurality of sections in the area, determining an altitude value of that section;
determining that the determined altitude values meet a threshold condition when a threshold percentage of the determined altitude values is within a threshold amount of altitude from a computed mean or median value, or value-of-interest, of the determined altitude values;
upon determining that the determined altitude values meet the threshold condition, measuring a pressure by a pressure sensor of the mobile device, and determining a three-dimensional position of the mobile device using an estimated altitude of the mobile device determined using the pressure measured by the pressure sensor; and
calibrating the pressure sensor of the mobile device using the estimated altitude and a representative altitude value for the area, wherein the representative altitude value is determined using the determined altitude values;
wherein determining the area in which the mobile device is expected to reside comprises:
determining an initial estimate of a position of the mobile device;
determining a location confidence value; and
defining the area using the initial estimate of the position of the mobile device and the location confidence value;
wherein defining the area comprises:
determining a circular area centered at the initial estimate of the position of the mobile device with a radius equal to a product of the location confidence value multiplied by a scale factor;
determining if the circular area includes at least a threshold number of sections;
if the circular area includes at least the threshold number of sections, defining the area as the circular area; and
if the circular area does not include at least the threshold number of sections, determining a new circular area centered at the initial estimate of the position of the mobile device with a radius equal to a product of the location confidence value multiplied by another scale factor, and then repeating the step of determining if the circular area includes at least the threshold number of sections using the new circular area instead of the previous circular area.

12. The method of claim 11, wherein the value-of-interest is an altitude value at a center of the area.

13. The method of claim 11, wherein the value-of-interest is an altitude value associated with an initial estimate of a position of the mobile device.

14. A method comprising:
determining an area in which a mobile device is expected to reside;
for each section of a plurality of sections in the area, determining an altitude value of that section;
determining that the determined altitude values meet a threshold condition when a threshold percentage of the determined altitude values is within a threshold amount of altitude from a computed mean or median value, or value-of-interest, of the determined altitude values;
upon determining that the determined altitude values meet the threshold condition, measuring a pressure by a pressure sensor of the mobile device, and determining a three-dimensional position of the mobile device using an estimated altitude of the mobile device determined using the pressure measured by the pressure sensor; and
calibrating the pressure sensor of the mobile device using the estimated altitude and a representative altitude value for the area, wherein the representative altitude value is determined using the determined altitude values;
wherein determining the area in which the mobile device is expected to reside comprises:
determining an initial estimate of a position of the mobile device;
determining a location confidence value;
defining the area using the initial estimate of the position of the mobile device and the location confidence value;
wherein defining the area comprises:
determining a circular area centered at the initial estimate of the position of the mobile device with a radius equal to a product of the location confidence value multiplied by a scale factor;
determining if the circular area includes no more than a threshold number of sections;
if the circular area includes no more than the threshold number of sections, defining the area as the circular area; and
if the circular area includes more than the threshold number of sections, determining a new circular area centered at the initial estimate of the position of the mobile device with a radius equal to a product of the location confidence value multiplied by another scale factor, and then repeating the step of determining if the circular area includes no more than the threshold number of sections using the new circular area instead of the previous circular area.

15. A method comprising:
determining an area in which a mobile device is expected to reside;
for each section of a plurality of sections in the area, determining an altitude value of that section;
determining that the determined altitude values meet a threshold condition when a threshold percentage of the determined altitude values is within a threshold amount of altitude from a computed mean or median value of the determined altitude values;
upon determining that the determined altitude values meet the threshold condition, measuring a pressure by a pressure sensor of the mobile device, and determining a three-dimensional position of the mobile device using an estimated altitude of the mobile device determined using the pressure measured by the pressure sensor; and calibrating the pressure sensor of the mobile device using the estimated altitude and a representative altitude value for the area, wherein the representative altitude value is determined using the determined altitude values;

wherein determining that the threshold percentage of the determined altitude values are within the threshold amount of altitude from the computed mean or median value of the determined altitude values comprises:

determining a distribution of the determined altitude values;

using the distribution to determine an amount of altitude within which the threshold percentage of the determined altitude values are from the computed mean or median value of the determined altitude values; and determining that the threshold percentage of the determined altitude values are within the threshold amount of altitude from the computed mean or median value of the determined altitude values when the amount of altitude is equal to or less than the threshold amount of altitude.

16. A method comprising:

determining an area in which a mobile device is expected to reside;

for each section of a plurality of sections in the area, determining an altitude value of that section;

determining that the determined altitude values meet a threshold condition when a threshold percentage of the determined altitude values are within a threshold amount of altitude from each other;

upon determining that the determined altitude values meet the threshold condition, measuring a pressure by a pressure sensor of the mobile device, and determining a three-dimensional position of the mobile device using an estimated altitude of the mobile device determined using the pressure measured by the pressure sensor; and calibrating the pressure sensor of the mobile device using the estimated altitude and a representative altitude value for the area, wherein the representative altitude value is determined using the determined altitude values;

wherein determining if the threshold percentage of the determined altitude values are within the threshold amount of altitude from each other comprises:

determining a distribution of the determined altitude values;

using the distribution to determine a percentage of the determined altitude values that are within the threshold amount of altitude from each other; and determining that the threshold percentage of the determined altitude values are within the threshold amount of altitude from each other when the percentage is equal to or greater than the threshold percentage.

17. A method comprising:

determining an area in which a mobile device is expected to reside;

for each section of a plurality of sections in the area, determining an altitude value of that section;

determining that the determined altitude values meet a threshold condition when a threshold percentage of the determined altitude values are within a threshold amount of altitude from each other;

upon determining that the determined altitude values meet the threshold condition, measuring a pressure by a pressure sensor of the mobile device, and determining a three-dimensional position of the mobile device using an estimated altitude of the mobile device determined using the pressure measured by the pressure sensor; and calibrating the pressure sensor of the mobile device using the estimated altitude and a representative altitude value for the area, wherein the representative altitude value is determined using the determined altitude values;

wherein determining if the threshold percentage of the determined altitude values are within the threshold amount of altitude from each other comprises:

determining a distribution of the determined altitude values;

using the distribution to determine an amount of altitude within which the threshold percentage of the determined altitude values are from each other; and determining that the threshold percentage of the determined altitude values are within the threshold amount of altitude from each other when the amount of altitude is equal to or less than the threshold amount of altitude.

* * * * *